Figure 1:
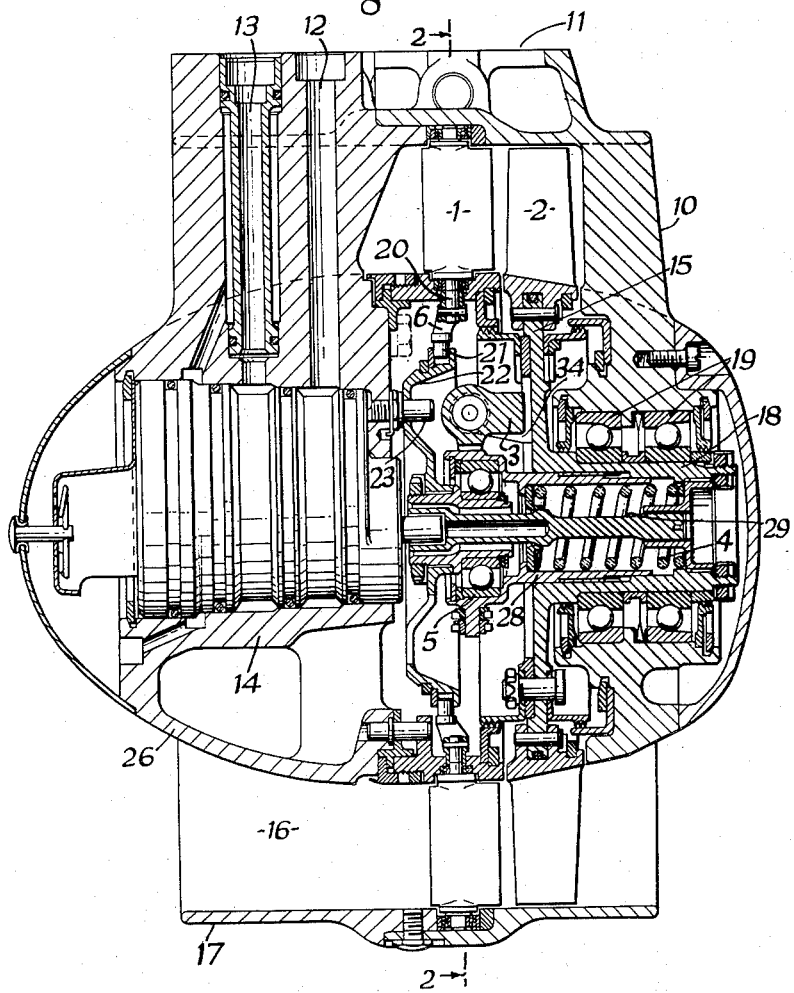

June 13, 1961  D. R. TROWBRIDGE ET AL  2,988,327
EMERGENCY POWER SYSTEMS FOR AIRCRAFT AUXILIARY APPARATUS
Filed Jan. 28, 1957  3 Sheets-Sheet 1

INVENTORS
DAVID R. TROWBRIDGE.
NORMAN MOSS.
GEORGE NUNN.
ATTORNEY

United States Patent Office 2,988,327
Patented June 13, 1961

2,988,327
EMERGENCY POWER SYSTEMS FOR AIRCRAFT AUXILIARY APPARATUS
David Roy Trowbridge, Hutton Mount, near Brentwood, Norman Moss, London, and George Nunn, South Woodford, England, assignors to The Plessey Company Limited, Ilford, England, a British company
Filed Jan. 28, 1957, Ser. No. 636,831
Claims priority, application Great Britain Feb. 3, 1956
1 Claim. (Cl. 253—59)

In order to provide power for the operation of auxiliary apparatus of an aircraft, such as control servo-mechanism and landing gear, in the case of engine failure or control system failure, it has previously been proposed to provide an auxiliary power unit including a small air turbine which is normally stowed within the aircraft but is, for example, adapted to be moved into the air stream around the aircraft when required to provide power. As hitherto constructed these so-called ram air turbines comprise a rotor having a single set of blades, the flow of air, collected in some cases by a ram air duct, entering the set of blades axially without swirl, so that the turbine works purely by reaction.

It is an object of the present invention to provide an improved emergency power ram air turbine system which can be conveniently combined with means for regulating the turbine speed.

According to the invention the ram duct is equipped with nozzle-forming deflector blades (inlet guide vanes) to impart to the flow of air a swirl about the axis of the turbine.

Preferably the construction is such that under normal full-load conditions the turbine operates as a substantially pure impulse turbine, the rotor blades being constructed accordingly.

Since the ram air turbine should supply adequate auxiliary power down to low flying speed, its speed will tend to be excessive at maximum speed of the aircraft. Since moreover in an impulse turbine the no-load speed is usually approximately twice the normal-load speed, and on the other hand auxiliary power is only required from time to time, it is desirable to provide means for restricting the speed of the turbine when little or no power is used. According to a feature of the invention this is effected by turning the guide vanes. The deflector blades may, to reduce the output torque, be turned towards the tangential plane so as to reduce the outlet area of the nozzles and this technique has occasionally been employed in the prior art to control the speed of ram air turbines.

However, more particularly when twisted deflector blades are used to increase efficiency at low air speeds, the reduction in torque obtainable by turning the blade towards the tangential plane is not always sufficient to prevent the turbine speed from rising unduly at very high air speeds. In order to obtain a more effective speed control, according to a feature of the invention the blades are turned in the opposite direction so that while the oulet cross-section remains more or less unaffected, the direction of the flow striking the rotor blades becomes more nearly perpendicular to the direction of rotor blade movement and may even pass through the 90° direction so as to acquire a reverse component and produce a reverse impulse torque adapted to counteract any undesired residual forward reaction torque.

It has been found that speed control by the means of this feature is more conveniently applied due to the lower aerodynamic forces involved. Greater freedom is also permissible in the design of the deflector blades so as to achieve a high turbine efficiency at low air speeds as blades of suitable design will not necessarily completely blank off sufficient flow when they are turned to the limit of their travel towards the tangential direction. Furthermore, if in an externally mounted ram air turbine, it is not necessary to blank off the air in order to achieve control, it follows that the overall aero-dynamic drag of the unit will be appreciably less. For this purpose the vanes are coupled to a centrifugal governor through actuating arms co-operating with a ring actuated by the governor through a thrust bearing, preferably a thrust ball bearing; according to a further feature the centrifugal governor acts against a spring rotating with the governor, so as to avoid the necessity of transmitting the spring force through the thrust bearing.

Figure 2:
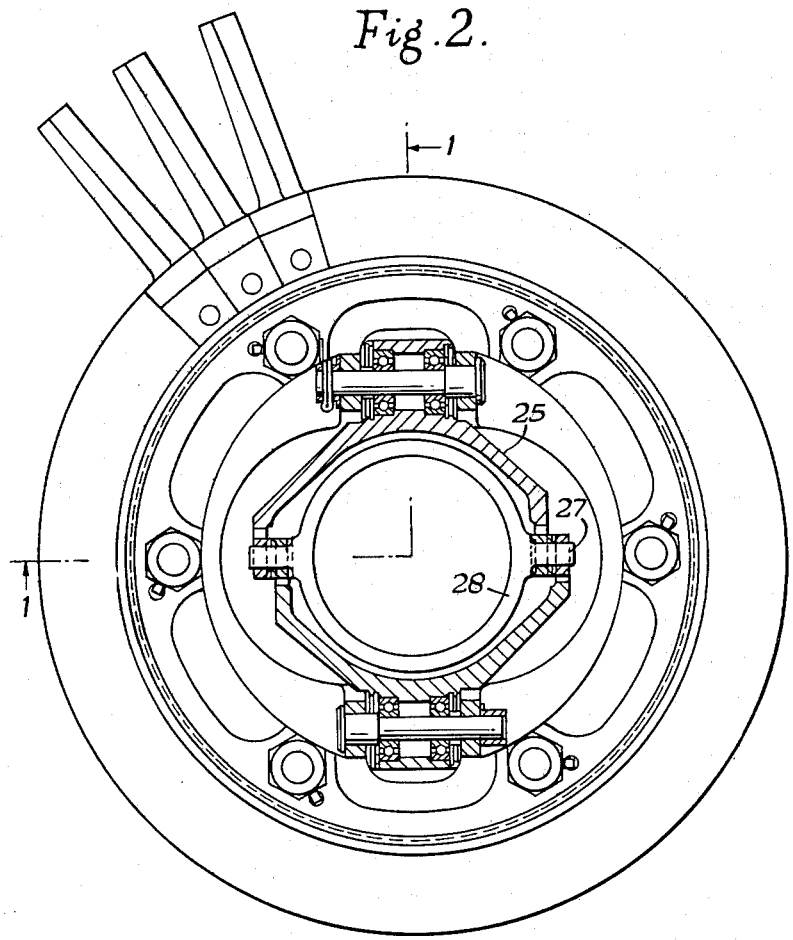
Figure 3:
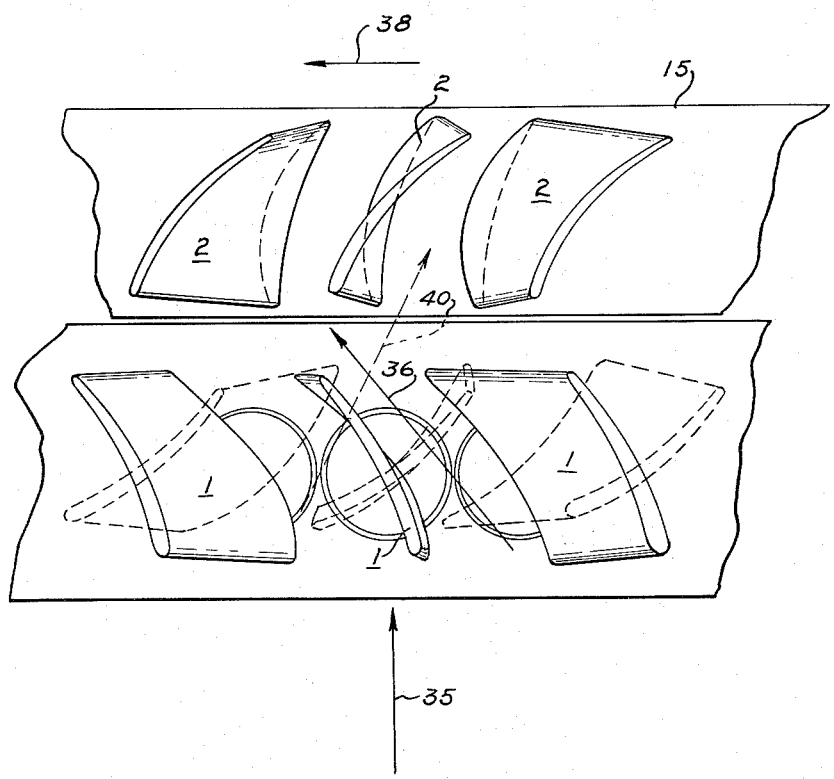

An embodiment of the invention will now be described with reference to the accompanying drawings, in which:

FIGURE 1 is an elevation in section, on line 1—1 of FIGURE 2 of a ram air turbine set according to the invention in which the turbine is arranged to drive a hydraulic pump, FIGURE 2 is a section on line 2—2 of FIGURE 1, and FIGURE 3 is an enlarged, broken, substantially schematic top plan view illustrating the relationship between the stator and rotor blades of the invention.

Referring now to the drawings, the pump and turbine are jointly housed in a housing body 10 having an attachment surface 11 at which the assembly is adapted to be connected to, for example, the wing of an aeroplane. An inlet duct 12 and an outlet duct 13 connect the pump respectively with, for example, a hydraulic liquid reservoir, sump, or the like and with the hydraulic pressure system of the aeroplane, the pump itself being generally indicated at 14. The turbine has a single turbine wheel 15 carrying rotor blades 2, to which a ram air flow is supplied through an annular duct 16 formed between a streamlined nacelle 26 forming part of the housing 10 and a duct wall 17 arranged round the nacelle in spaced relation thereto. The wheel 15 is carried by a hollow hub 18 mounted in the housing in shoulder-type ball bearings 19 and is coupled to the pump by means of a coupling spindle 29 extending through the hollow interior of the hub 18. According to a feature of the invention, a set of nozzle forming deflector blades or guide vanes 1 is arranged in the annular ram duct 16, a short distance ahead or upstream of the rotor blades 2, for deflecting the air stream reaching the rotor blades 2 from its normal axial direction into a direction having a tangential component dependent upon the position of the deflector blades 1. In order to enable this position to be varied, each blade is mounted on a trunnion 20, which is rotatable in the turbine housing 10 by means of a crank 6 which is fixed on the trunnion 20. Each crank 6 is provided at its free end with a crank pin 21, and all crank pins 21 engage a peripheral groove of a common blade-setting member 22, which is mounted on the hub of the pump 14 so as to be axially slidable thereon while being prevented from rotation by a pin 23 extending axially from the pump body. It will be seen that axial displacement of the setting member 22 in one direction or the other will cause all deflector blades to be turned about the axes of their trunnions 20 to vary the angle of incidence of the flow striking the rotor blades 2 in one direction or the other according to the direction of movement of the setting member 22. In order now to effect automatically the requisite movements of this setting member according to the speed at which the turbine wheel 15 rotates, a number of fly-weights 3 are pivotally mounted in brackets 34 carried by the turbine wheel 15. Each weight 3 is provided with crank arms 25 which, as shown more clearly in FIG. 2, engage pins 27 of a thrust sleeve 28. The latter is mounted inside the wheel hub 18, with which is coupled for common rotation by external fluting while being free to move axially relative to the hub.

A helical compression spring 4 is interposed between the thrust sleeve 28 and an internal flange of the wheel hub 18 to urge the thrust sleeve 28 and flyweights 3 into the normal position shown in FIG. 1. A deep-groove ball bearing 5 is interposed between the thrust sleeve 28 and the crank setting member 22 which, as already mentioned, does not participate in the rotation of the turbine wheel and thrust sleeve, to transmit the axial thrust from the sleeve 28 to the setting member 22 so that the latter will move forward and back in the axial direction jointly with the thrust sleeve 28.

In operation, and with particular reference to FIGURE 3, when the turbine wheel 15 is operating at normal speed the stator blades 1 are urged through the action of spring 4 and blade-setting member 22 into the full line position shown so as to change the normal axial flow of the ram air, as indicated by the arrow 35, into a tangential direction, as indicated by the arrow 36, so that said ram air impinges on said rotor blades tangentially to drive said rotor normally in the direction of arrow 38 by impulse action. Should the rotor speed increase above its normal speed of operation, the centrifugal action of the fly weights 3 will overcome the force of spring 4 and the thrust sleeve 28 and crank-setting member 22 will therefore move to the right in FIGURE 1. Upon this occurrence, due to the engagement of the crank pins 21 with the peripheral groove of the setting member 22, the cranks 6 will turn the stator blades 1 about their trunnion axes toward the dotted line position of FIGURE 3. It will be observed in FIGURE 3 that the blades 1 have their pivots so arranged that as the blades move from their full line position towards their dotted line position the cross sectional area between adjacent blades remains substantially unchanged and as the angularity of the blades progressively changes towards or slightly beyond an axial direction, the flow of ram air is guided in a direction such that it passes substantially between the rotor blades as indicated by the broken line arrow 40; that is to say, the direction of ram air flow is progressively changed from a tangential towards an axial direction without any substantial decrease in the volume of mass flow until a point is reached at which the ram air no longer produces a driving effect on the rotor blades and if the residual speed of the rotor be above the normal desired speed, the stator blades may be turned beyond an axial position so as to exert a component of force on the rotor blades in opposition to its direction of movement. As the speed of the rotor decreases the force of the spring 4 progressively returns the stator blades to the tangential position of FIGURE 3 so that the rotor blades again receive an impulse force sufficient to retain the speed of the rotor at the desired rate.

It will be apparent to those skilled in the art that the present invention is susceptible of a variety of modifications without however departing from the scope and spirit of the invention hereinafter claimed.

What is claimed is:

A ram air turbine comprising an inner duct wall and an outer duct wall surrounding the inner duct wall and spaced therefrom so as to define a ram air inlet passage, a rotor, a plurality of radially directed, impulse type blades on the rotor intersecting the passage and arranged to receive a tangential component of ram air for normal operation of said rotor, a ring of radially directed stator blades in said passage upstream of said rotor blades, a pivot means for each stator blade so arranged that the angle made by the blade with respect to the direction of ram air flow through the passage can be varied without a substantial change in the cross sectional area between adjacent blades, resilient means normally urging said stator blades to a position for guiding the flow of ram air onto said rotor blades in a tangential direction which causes normal operation of said rotor, means housed inside the inner duct for simultaneously rotating the stator blades about their respective pivot means, a governor mechanism located inside the inner duct and sensitive to the speed of said rotor, and a driving connection between the governor mechanism and the means for rotating the stator blades, said driving connection being arranged so as to progressively change the angularity of said stator blades and hence the flow of said ram air from a tangential towards an axial direction so as to progressively reduce the driving effect of said ram air on said rotor proportionately as the speed thereof increases.

References Cited in the file of this patent

UNITED STATES PATENTS

| | | |
|---|---|---|
| 329,567 | Kahl | Nov. 3, 1885 |
| 752,604 | Taylor | Feb. 16, 1904 |
| 796,395 | Belches | Aug. 1, 1905 |
| 2,412,365 | Sollinger | Dec. 10, 1946 |
| 2,610,464 | Knoll | Sept. 16, 1952 |
| 2,689,680 | Lovesey | Sept. 21, 1954 |
| 2,694,979 | Lauck | Nov. 23, 1954 |
| 2,715,367 | Kodet et al. | Aug. 16, 1955 |
| 2,752,858 | Berges | July 3, 1956 |
| 2,754,049 | Lovesey | July 10, 1956 |
| 2,815,188 | Nelson | Dec. 3, 1958 |

FOREIGN PATENTS

| | | |
|---|---|---|
| 479,889 | Great Britain | Feb. 14, 1938 |